(12) United States Patent
Nisinosono et al.

(10) Patent No.: US 8,382,064 B2
(45) Date of Patent: Feb. 26, 2013

(54) SOLENOID VALVE

(75) Inventors: Hiroyuki Nisinosono, Tokyo (JP);
Yoshinari Kasagi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 135 days.

(21) Appl. No.: 12/991,754

(22) PCT Filed: Aug. 26, 2009

(86) PCT No.: PCT/JP2009/064845
§ 371 (c)(1),
(2), (4) Date: Nov. 9, 2010

(87) PCT Pub. No.: WO2010/024282
PCT Pub. Date: Mar. 4, 2010

(65) Prior Publication Data
US 2011/0057133 A1 Mar. 10, 2011

(30) Foreign Application Priority Data
Aug. 29, 2008 (JP) ................. 2008-221121

(51) Int. Cl.
*F16K 31/02* (2006.01)
(52) U.S. Cl. ........... 251/129.15; 251/361; 251/365
(58) Field of Classification Search ........ 251/129.15, 251/129.01, 356, 361, 365; 137/596.17
See application file for complete search history.

(56) References Cited

U.S. PATENT DOCUMENTS

| | | | | |
|---|---|---|---|---|
| 4,597,558 A | * | 7/1986 | Hafner et al. | 239/585.1 |
| 4,653,720 A | * | 3/1987 | Knapp et al. | 251/65 |
| 4,807,846 A | * | 2/1989 | Greiner et al. | 251/129.15 |
| 5,681,098 A | * | 10/1997 | Ganzel et al. | 303/119.2 |
| 5,791,747 A | * | 8/1998 | Sorensen et al. | 303/119.2 |
| 5,820,099 A | * | 10/1998 | Rahbar et al. | 251/129.15 |
| 6,073,911 A | * | 6/2000 | Reiter | 251/324 |
| 7,070,163 B2 | * | 7/2006 | Tochiyama et al. | 251/129.15 |
| 7,165,574 B2 | * | 1/2007 | Ryuen et al. | 137/596.17 |
| 7,195,226 B2 | * | 3/2007 | Linkner et al. | 251/129.15 |
| 7,552,908 B2 | * | 6/2009 | Mitsumata et al. | 251/129.15 |
| 7,578,494 B2 | * | 8/2009 | Mitsumata et al. | 251/129.15 |
| 7,900,543 B2 | * | 3/2011 | Ikeda et al. | 83/563 |
| 8,070,129 B2 | * | 12/2011 | Makino | 251/129.15 |
| 2004/0045607 A1 | * | 3/2004 | Lammers | 137/543 |

(Continued)

FOREIGN PATENT DOCUMENTS

| | | |
|---|---|---|
| JP | 2000104847 | 4/2000 |
| JP | 2002228038 | 8/2002 |

(Continued)

*Primary Examiner* — John K Fristoe, Jr.
*Assistant Examiner* — Marina Tietjen
(74) *Attorney, Agent, or Firm* — Harness, Dickey & Pierce, PLC

(57) ABSTRACT

Provided are a solenoid valve which is configured such that the valve body is not deformed when a retainer is mounted and which can be easily assembled, and a method of manufacturing the solenoid valve. A solenoid valve is provided with a valve body inside which a spool is provided so as to move in an axial direction, a solenoid section which is mounted to one end of the valve body in the axial direction thereof, and a retainer which is mounted to the other end of the valve body in the axial direction thereof. The retainer is fixed by a staking section which is provided to an end of the valve body in the axial direction thereof and staked in the axial direction.

3 Claims, 4 Drawing Sheets

U.S. PATENT DOCUMENTS

2004/0113112 A1 6/2004 Hirata et al.
2004/0231335 A1 11/2004 Tochiyama et al.
2004/0262557 A1* 12/2004 Carrillo et al. ............ 251/129.14
2005/0067028 A1* 3/2005 Ryuen et al. ............. 137/596.17

FOREIGN PATENT DOCUMENTS

JP 2004169685 6/2004
JP 2007205248 8/2007

* cited by examiner

SOLENOID VALVE

TECHNICAL FIELD

The present invention relates to a spool type solenoid valve preferably applied for an oil controlling for an oil pressure device and the like.

BACKGROUND ART

As a conventional solenoid valve, as shown in the following Patent Document 1, there has been provided a solenoid valve wherein a retainer is inserted into a valve body, a portion which the valve body overlapped with the retainer is made as a thin wall, the retainer is fixed by caulking the thin wall portion in a radius direction.

For the solenoid valve having such constitution, the inner circumferential wall of the valve body is sometimes deformed due to the collapse of the valve main body in the radius direction because a force is applied to the radius direction when caulking the retainer. As a result, there is a case to become a cause of increasing hysteresis because smooth operation of a spool sliding to the axial direction at the inside of the valve body is inhibited, the spool will not be moving in the worst case.

Also, for the solenoid valve in the Patent Document 1, a screw cutting is performed in the valve body in order to fix the retainer and it is necessary to perform screw-driving to a predetermined position. Thus, assembling property is insufficient and further, there is a problem that a manufacturing cost becomes higher when performing a threading process because there is a large number of man-hour for producing components.

Prior Art Literatures

Patent Document

Patent Document 1: Japanese Unexamined Patent Publication No. 2000-104847

SUMMARY OF THE INVENTION

Problems to be Solved by the Invention

The present invention has been made by considering the above problems, a purpose thereof is to provide a solenoid valve which does not cause a deformation in a valve body when mounting a retainer and which can be easily assembled, and also a method for manufacturing thereof.

Means for Solving the Problem

In order to achieve the above purpose, a solenoid valve according to the present invention comprises a valve body in which a spool is provided so as to move in an axial direction, a solenoid portion provided at one axial end of said valve body, a retainer provided at the other axial end of said valve body, wherein a caulking portion provided at the axial end of the valve body is caulked from the axial direction so that the retainer is fixed.

By making such constitution, because a pressure force on caulking the retainer acts only in the axial direction (the pressure force does not act in the radius direction of the valve body), the pressure force does not act on a sliding portion of the spool of the valve body, and deformation is not achieved to the sliding portion of the spool in the valve body. Therefore, a sliding motion of the spool at the inside of the valve body is not inhibited, and the spool can be moved smoothly in the axial direction.

In the present invention, preferably, a groove for inserting a caulk receiving jig is formed near said caulking portion in the axial direction.

By making such constitution, the caulk receiving jig can be arranged to the groove when caulking the retainer. Therefore, the pressure force which acts along the axial direction can be applied to the caulk receiving jig when caulking the retainer, and the valve body is not deformed in the axial direction of the valve body. Namely, it preferably enables to prevent the valve body from deforming, and the sliding movement of the spool which is axially movably arranged at the inside of the valve body is not inhibited.

In the present invention, preferably, said retainer is comprised of a cylindrical body, a flange portion projecting to an outer radius direction is formed at one opening end of the axial direction of said cylindrical body, the caulking portion of said valve body is comprised of a caulking piece projecting from the other axial end of said valve body.

By making such constitution, it enables to caulk the flange portion as covered by the caulking pieces according to contacting the flange portion of the retainer at the inside of the radial direction of caulking pieces in the valve body. Therefore, a process for a solenoid valve assembly can be simplified and it becomes more efficient, because it is not necessary to perform a screw cutting to the valve body and the retainer can be fixed to the valve body.

Also, in order to achieve the above purpose, a method for manufacturing solenoid valve of the present invention comprises steps of, providing a caulking portion at the axial end portion of a valve body, forming a groove for inserting a caulk receiving jig near said caulking portion in the axial direction, arranging a spool as axially movably at the inside of the valve body, mounting a solenoid portion at one axial end of said valve body, arranging said caulk receiving jig at said groove, and mounting the retainer at the other axial end of said valve body by caulking said caulking portion from the axial direction to the retainer.

By the method for manufacturing solenoid valve having such constitution, the valve body is not deformed in the radius direction of the valve body, because a pressure force acts only in the axial direction when caulking the retainer (the pressure force does not act in the radius direction of the valve body) and also the pressure force can be produced to the caulk receiving jig when caulking the retainer. Therefore, a sliding motion of the spool which is arranged axially movably at the inside of the valve body is not inhibited.

Also, it is not necessary to perform a screw cutting to the valve body, because the retainer can be fixed to the valve body by caulking from the axial direction with the caulking portion. Therefore, the process for a solenoid valve assembly can be simplified and it becomes more efficient.

Effects of the Invention

According to the present invention, it is possible to provide a solenoid valve which is configured such that the valve body is not deformed when a retainer is mounted and which can be easily assembled, and also a method for manufacturing thereof.

DETAILED DESCRIPTION

Figure 1:
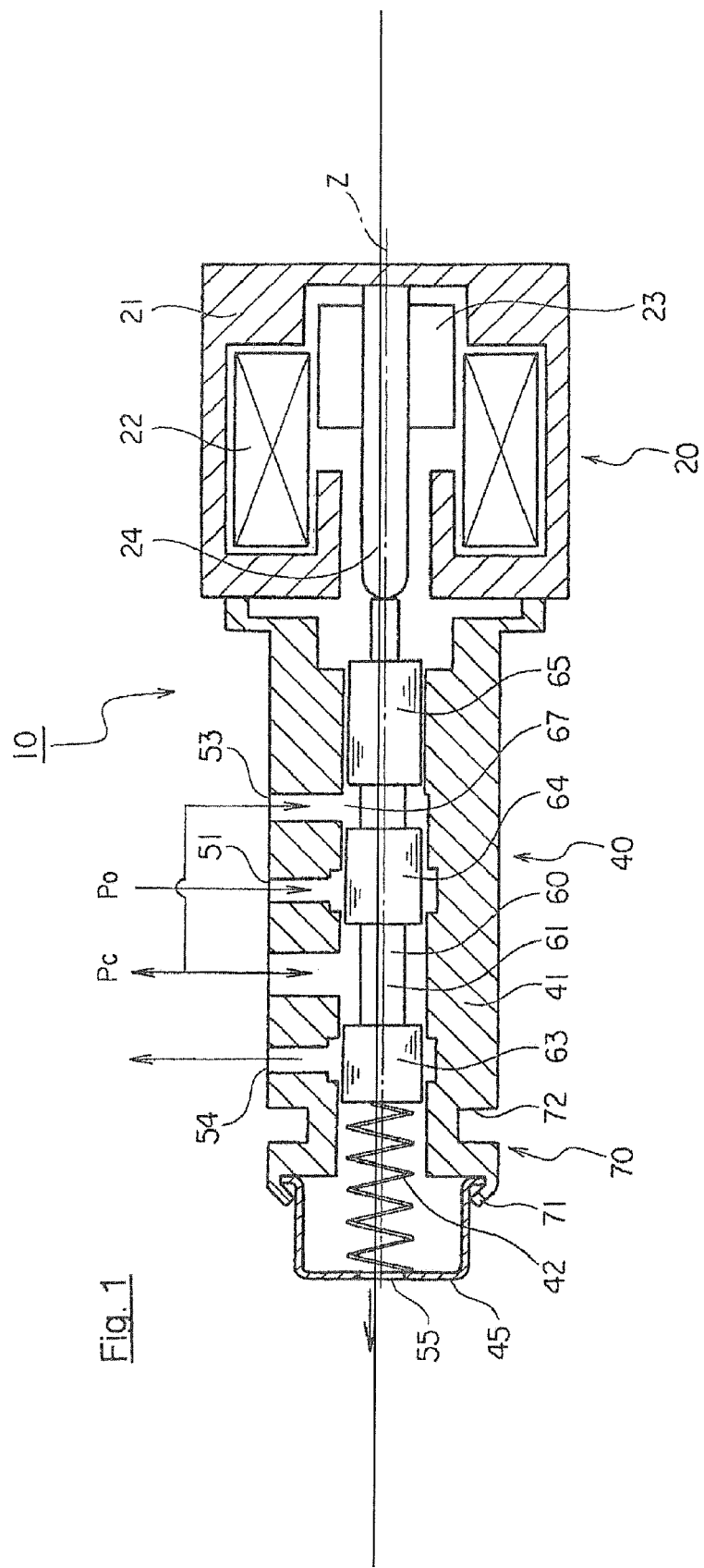
FIG. 1 is a cross sectional view of a solenoid valve according to one embodiment of the present invention.
Figure 2A:
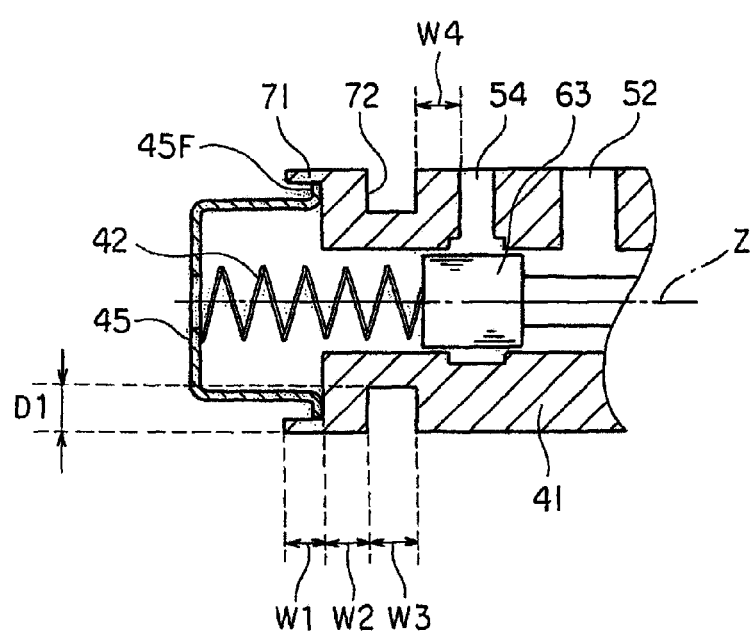
FIG. 2A is a main portion cross sectional view of a retainer in the solenoid valve shown in FIG. 1 before caulking.
Figure 2B:
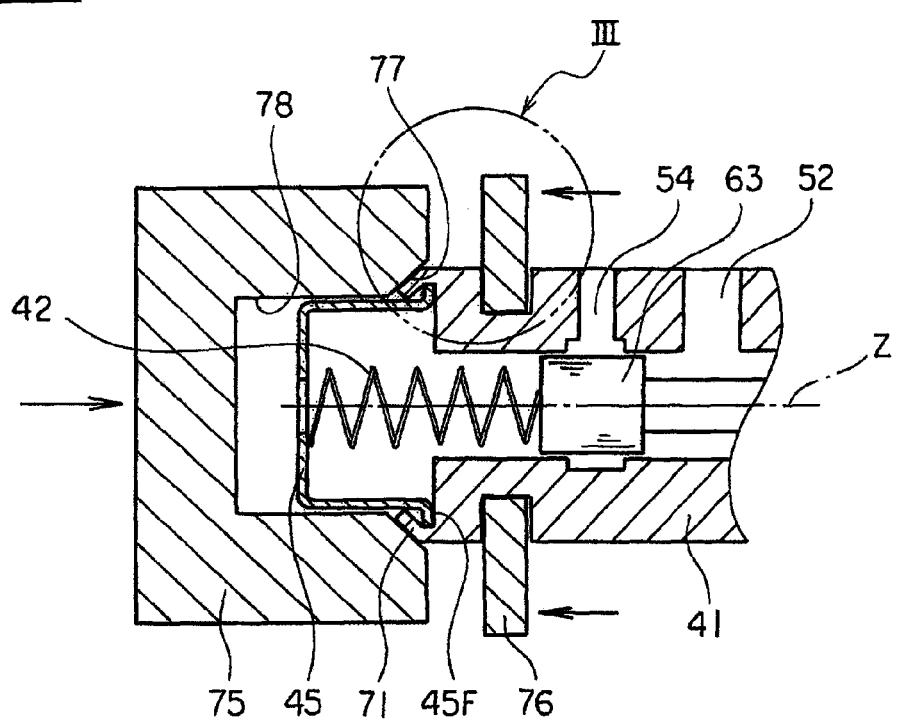
FIG. 2B is a main portion cross sectional view of a retainer in the solenoid valve shown in FIG. 1 when caulking.
Figure 3:
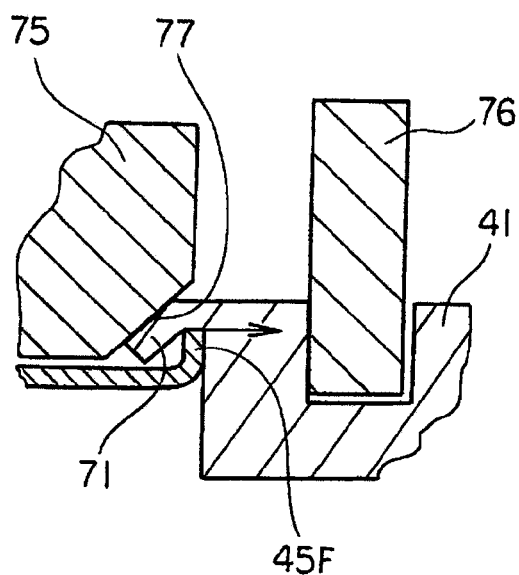
FIG. 3 is a main portion enlarged view of FIG. 2B.

Hereinafter, the present invention will be explained on the basis of embodiments shown in drawings. FIG. 1 is a cross sectional view of a solenoid valve according to one embodiment of the present invention, FIG. 2A is a main portion cross sectional view of a retainer in the solenoid valve shown in FIG. 1 before caulking, FIG. 2B is a main portion cross sectional view of a retainer in the solenoid valve shown in FIG. 1 when caulking, FIG. 3 is a main portion enlarged view of FIG. 2B.

As shown in FIG. 1, a solenoid valve 10 according to an embodiment of the present invention is a spool type solenoid valve to control an oil pressure of, for example, an automatic transmission of vehicle.

The solenoid valve 10 comprises a solenoid portion (linear solenoid) 20 as an electromagnetic drive portion, a valve body 40 as a valve portion and a retainer 45. The solenoid portion 20 is mounted at one end along the axial direction Z of the valve body 40, and the retainer 45 is mounted at the other end along the axial direction Z of the valve body 40.

The solenoid portion 20 comprises a rod 24, a plunger 23 and a coil 22 at the inside of a case 21.

The case 21 is configured with a cylindrical body having a bottom, and the rod 24 is arranged at roughly at center of the case 21 along the axial direction Z. The rod 24 contacts with a spool 60 at one end of the axial direction Z, the spool 60 is arranged at the inside of the valve body 40.

The plunger 23 which is integrally movable with the rod 24, is arranged at an outer circumferential surface of the rod 24. Also, the coil 22 is arranged at an outer circumferential side of the plunger 23, and the coil 22 generates a magnetic field in a desired direction with a desired strength according to a controlling current provided from a control circuit (not shown). Although a material of the case 21 is not particularly limited, it is manufactured by using a magnetic material, for example, SPCC, SPCE, SUY and the like.

The valve body 40 comprises a spring 42 and the spool 60 at the inside of a valve sleeve 41.

The valve sleeve 41 is configured with a cylindrical body, the spring 42 and the spool 60 are arranged at roughly at center of the valve sleeve 41 along the axial direction Z. The spool 60 contacts with the spring 42 at one end of the axial direction Z, and contacts with the rod 24 at the other end of the axial direction Z.

As openings penetrating a circumferential wall of the valve sleeve 41, an inlet port 51, an outlet port 52, a feedback port 53 and a first drain port 54 are formed on the valve sleeve 41. Note that, the inlet port 51, the outlet port 52, the feedback port 53 and the first drain port 54 are formed as a plural respectively, toward a circumferential direction.

The inlet port 51 is a port to which a controlling fluid (for example, hydraulic oil) provided by a pump from a tank which are not shown.

The outlet port 52 is a port supplying a fluid which is controlled by a desired pressure to a requested fluid portion (load) of an automatic converter which is not shown.

The outlet port 52 and the feedback port 53 are communicating through at an external portion of the solenoid valve 10, and some part of the controlling fluid flown from the outlet port 52 flows into the feedback port 53.

The first drain port 54 is a port which outlets the controlling fluid at the outlet port 52 side to a drain.

The spring 42 is mounted between the spool 60 and an inner circumferential surface of a retainer 45 which is mentioned below along the axial direction Z, and presses the spool 60 in the axial direction Z.

The spool 60 is movably arranged at roughly at center of the valve sleeve 41 along the axial direction Z, and is constituted by a spool axis 61 and a first to third lands 63 to 65 which are formed as cylindrically.

The first to third lands 63 to 65 are formed integrally with the spool axis 61 from an end portion of the spring 42 side of the spool 60 along the axial direction Z with predetermined spaces sequentially.

Outer diameters of the first to third lands 63 to 65 are larger than an outer diameter of the spool axis 61. Also, although the outer diameters of the fist land 63 and the second land 64 are about the same, the outer diameter of the third land 65 is smaller compared to the outer diameters of the first land 63 and the second land 64.

A feedback chamber 67 is formed between the second land 64 and the third land 65 at the inside of the valve sleeve 41. Because there is an outer diameter difference between the second land 64 and the third land 65, the areas to which the controlling fluid fed back by the feedback chamber 67 that acting to the spool 60 are different. As a result, a desired output pressure Pc can be obtained by a balance of three forces which are a feedback force generated by the difference of the area (outer diameter difference between the land 64 and the land 65), a spring force by the spring 42 and an electromagnetic force which changes by the volume of current. For example, in case the controlling valve is the type that an output pressure decreases as an electric current supplied to the solenoid portion 20 is increased, the balance of three forces can be shown by the following formula (1);

[spring force]=[output pressure(=feedback force generated at outer diameter difference of lands)]+ [electromagnetic force]   (1).

Also, in case the controlling valve is the type that an output pressure increases as an electric current supplied to the solenoid portion 20 is decreased, the balance of three forces can be shown by the following formula (2);

[spring force]+[output pressure(=feedback force generated at outer diameter difference of lands)]= [electromagnetic force]   (2).

Along the axial direction Z, one end of the spool 60 contacts with the spring 42 and the other end of the spool 60 contacts with the rod 24. As a result, as well as a pressure force of the controlling fluid in the feedback chamber 67 (feedback force), a pressure force of the spring 42 (spring force) and a pressure force (electromagnetic force) by the movement of the plunger 23 via the rod 24 are transmitted to the spool 60. The spool 60 slides at the inside of the valve sleeve 41 in the axial direction Z by these pressure forces.

In the solenoid valve 10 having such constitution, the spool 60 rests at a position where a pressure force (spring force) generated by the spring 42, a pressure force (electromagnetic force) which the plunger 23 presses the spool 60 with a magnetic suction force of a magnetic field generated by an electric current supplied to the coil 22 and a pressure force (feedback force) generated by a pressure force of the controlling fluid in the feedback chamber 67 are balanced. Precisely, although it is balanced at a statically balanced position, it is practically controlled by opening and shutting the inlet port 51 and the first drain port 54 frequently.

A position of the spool 60 in the valve sleeve 41 is controlled by the above mentioned force, and the inlet port 51 and/or the first drain port 54 are opened and shut as desired status.

Also, the amount of the controlling fluid which flows from the inlet port 51 to the outlet port 52 is determined by an opening amount of the inlet port 51. The opening amount of the inlet port 51 is determined by a position of the spool 60 at the inside of the valve sleeve 41.

The amount of the controlling fluid which flows from the inlet port 51 to the outlet port 52 is increased by changing a position of the spool 60 at the inside of the valve sleeve 41 and enlarging the opening amount of the inlet port 51. Also, the amount of the controlling fluid which flows from the inlet port 51 to the outlet port 52 is decreased by reducing the opening amount of the inlet port 51.

Similarly, the amount of the controlling fluid which flows from the outlet port 52 to the fist drain port 54 is determined by the opening amount of the first drain port 54. The amount of the controlling fluid which flows from the outlet port 52 to the first drain port 54 is increased by changing a position of the spool 60 at the inside of the valve sleeve 41 and enlarging the opening amount of the first drain port 54. Also, the amount of the controlling fluid which flows from the outlet port 52 to the first drain port 54 is decreased by reducing the opening amount of the first drain port 54.

Namely, in the solenoid valve 10 of the present embodiment, in case that the output pressure Pc (=feedback force generated by outer diameter difference of the land) is smaller than a desired pressure, the spool 60 moves to the solenoid portion 20 side along the axial direction Z to open the inlet port 51. As a result, an inlet pressure Po is provided to the inside of the valve body 40 through the inlet port 51. On the other hand, in case that the outlet pressure Pc is larger than a desired pressure, the spool 60 moves to the spring 42 side along the axial direction Z and the first drain port 54 is caused to open so that the pressure force Pc is emitted through the first drain port 54.

A caulking portion 70 is formed at the end of a retainer side along the axial direction Z of the valve sleeve 41. The caulking portion 70 comprises a caulking piece 71 which extends along the axial direction Z from the valve sleeve 41, and a groove 72 is formed near the axial direction Z of the caulking portion 70.

The caulking piece 71 may be formed on the whole circumference along a circumferential direction of the valve sleeve 41, or may be formed as intermittently at predetermined spaces along the circumferential direction of the valve sleeve 41. Also, it may be formed as intermittently at irregularly spaces along the circumferential direction of the valve sleeve 41.

The groove 72 may be formed on the whole circumference along the circumferential direction of the valve sleeve 41, or may be formed at predetermined spaces along the circumferential direction of the valve sleeve 41. Also, it may be formed as intermittently at irregularly spaces along the circumferential direction of the valve sleeve 41.

As shown in FIG. 2A, although a width W1 along the axial direction Z of the caulking piece 71 is not particularly limited, 0.5 to 3.0 mm is preferable and 1.5 to 2.0 mm is further preferable.

Also, a width W2 of the axial direction Z from the groove 72 to the caulking piece 71 is preferably 0.5 mm or more, and 1.0 to 4.0 mm is particularly preferable.

Also, a width W3 along the axial direction Z of the groove 72 is preferably 1.5 mm or more, and 2.0 to 3.0 mm is particularly preferable.

Also, for a depth D1 along the inside of a radius direction of the groove 72 from the outer diameter of the caulking piece 71, a depth which is available to receive a pressure force certainly that acts only in the axial direction Z when calking the retainer 45 is preferable, and 1.0 to 3.0 mm is particularly preferable.

Also, a width W4 of the axial direction Z from the groove 72 to the first drain port 54 is not particularly limited.

Although a material of the valve sleeve 41 is not particularly limited, it is manufactured by using, for example, aluminum and the like.

The retainer 45 is configured with a cylindrical body having a bottom, a flange portion 45F which projects to the outside of a radius direction is formed at one opening end along the axial direction Z of the cylindrical body. Also, a second drain port 55 is formed at the other end portion (bottom portion) along the axial direction Z of the cylindrical body. The spring 42 is mounted between the other end portion (bottom portion) along the axial direction Z of the cylindrical body and the spool 60, and the spring 42 presses the spool 60.

The flange portion 45F may be formed on the whole circumference along the circumferential direction of the retainer 45, or may be formed at predetermined spaces along the circumferential direction of the retainer 45. Also, it may be formed as intermittently at irregularly spaces along the circumferential direction of the retainer 45.

Although a material of the retainer 45 is not particularly limited, it is manufactured by using, for example, iron and the like.

As shown in FIG. 2B, when caulking the retainer 45, the flange portion 45F is caused to contact with the inner side of the radius direction of the caulking piece 71. After this, a caulk receiving jig 76 is arranged to the groove 72, and the flange portion 45F is caulked to be covered by the caulking piece 71 by applying a force from the axial direction Z to the caulking piece 71 with use of caulking tool 75 so that the retainer 45 is fixed to the valve sleeve 41.

The calking tool 75 is configured with a cylindrical body having a bottom, a tapered surface 77 is formed at the inside of the radius direction of one opening end along the axial direction Z of the cylindrical body. The retainer 45 is fitted to the inner surface 78 of a cylindrical body of the caulking tool 75, and the caulking piece 71 is bent to the inner side of the radius direction along the tapered surface 77 by pressing the caulking tool 75 to the axial direction Z so that the caulking piece 71 contacts with the tapered surface 77. Deformation of the valve sleeve 41 is prevented, because a pressing force of the caulking tool 75 is received effectively by the caulk receiving jig 76.

Also, as shown in FIG. 3, the pressing force of the caulking tool 75 acts to a position where the flange portion 45F contacts to the caulking piece 71. In order for receiving the pressing force effectively, it is preferable to make the depth D1 along the inside of the radius direction of the groove 72 deeper than the position where the flange portion 45F contacts with the caulking piece 71.

In the solenoid valve 10 configured like this, the coil 22 generates a magnetic field having desired strength and desired direction by being supplied an electric current from a controlling circuit which is not shown in the drawings to the coil 22 of the solenoid portion 20, and the plunger 23 is moved by the magnetic suction force of the magnetic field.

The spool 60 moves to the spring 42 side in the valve sleeve 41 of the valve body 40 by increasing the amount of the electric current supplied to the coil 22 and making a large magnetic suction force acts on the plunger 23.

When the spool 60 moves to the spring 42 side in the valve sleeve 41, the inlet port 51 closes and the first drain port 54 is caused to open. Therefore, the controlling fluid does not flow from the inlet port 51 to the outlet port 52, and the controlling fluid flows from the outlet port 52 to the first drain port 54. As a result, the pressure force Pc of the controlling fluid flown out from the outlet port 52 is decreased.

On the other hand, the spool 60 moves to the solenoid portion 20 side in the valve sleeve 41 by reducing the amount of the electric current supplied to the coil 22 and making the magnetic suction force which acts to the plunger 23 decreases.

When the spool 60 moves to the solenoid portion 20 side in the valve sleeve 41, the first drain port 54 closes and the inlet port 51 is caused to open. Accordingly, the controlling fluid flows from the inlet port 51 to the outlet port 52, and the controlling fluid does not flow from the outlet port 52 to the first drain port 54. As a result, the pressure force Pc of the controlling fluid flown out from the outlet port 52 is increased.

Namely, in the solenoid valve 10 of the present embodiment, the pressure force Pc of the controlling fluid which is output from the outlet port 52 decreases as the electric current supplied to the coil 22 is increased, and the pressure force Pc of the controlling fluid which is output from the outlet port 52 increases as the electric current supplied to the coil 22 is decreased.

In the solenoid valve 10 having such constitution, by controlling the electric value supplied to the coil 22, the pressure force of the controlling fluid flown out from the outlet port 52 is controlled according to the adjustment of the pressing force of the solenoid portion 20 to the spool 60 and the adjustment of a valve open-shut of the valve body 40.

Note that, the present invention is not limited to the above mentioned embodiment, it can be modified variously within the scope of the present invention. For example, arrangement for the inlet port 51, the outlet port 52, the feedback port 53 and the first drain port 54 in the valve body 40 are not limited to the example shown in FIG. 1, it may be a solenoid valve wherein the outlet port 52 and the feedback port 53 are changed.

In the solenoid valve having such constitution, a relation of the electric current supplied to the coil of the solenoid portion and a pressure force of the controlling fluid becomes opposite to the above mentioned solenoid valve 10. Namely, in this solenoid valve, the pressure force Pc of the controlling fluid which is output from the outlet port increases as the electric current supplied to the coil 22 is increased, and the pressure force Pc of the controlling fluid which is output from the outlet port decreases as the electric current supplied to the coil is decreased. Briefly, the solenoid valve is different from the solenoid valve 10 shown in FIG. 1 and has an opposite characteristic.

Also, in the above mentioned embodiment, the retainer 45 is caulked after arranging the caulk receiving jig 76 to the groove 72, however, the retainer 45 may be caulked without arranging the caulk receiving jig 76 to the groove 72.

What is claimed is:

1. A solenoid valve comprises
a valve body in which a spool is provided so as to move in an axial direction,
a solenoid portion provided at one axial end of said valve body,
a retainer provided at the other axial end of said valve body, wherein
the retainer is fixed by a caulking portion provided at the axial end of the valve body,
said retainer is comprised of a cylindrical body,
a flange portion projecting to an outer radius direction is formed at one opening end of the axial direction of said cylindrical body,
the caulking portion of said valve body is comprised of a caulking piece projecting from the other axial end of said valve body,
the flange portion contacts with an inner side of the caulking piece,
the flange portion is caulked to be covered by the caulking piece from the axial direction,
a groove is formed near said caulking portion in the axial direction and
a depth of the groove is deeper than a position where the flange portion contacts with the caulking piece.

2. The solenoid valve as set forth in claim 1, wherein a spring is held within said retainer, said spring presses said spool toward the solenoid portion along the axial direction.

3. A method for manufacturing solenoid valve comprising steps of,
providing a caulking portion at one axial end portion of a valve body,
forming a groove for inserting a caulk receiving jig near said caulking portion in the axial direction,
arranging a spool as axially movably at the inside of the valve body,
mounting a solenoid portion at the other axial end of said valve body,
arranging said caulk receiving jig at said groove, and
mounting a retainer at the axial end of said valve body by caulking said caulking portion from the axial direction to the retainer, wherein
said retainer is comprised of a cylindrical body,
a flange portion projecting to an outer radius direction is formed at one opening end of the axial direction of said cylindrical body,
the caulking portion of said valve body is comprised of a caulking piece projecting from the other axial end of said valve body,
the flange portion contacts with an inner side of the caulking piece,
the flange portion is caulked to be covered by the caulking piece from the axial direction and
a depth of the groove is deeper than a position where the flange portion contacts with the caulking piece.

* * * * *